United States Patent [19]

Back

[11] 4,131,017
[45] Dec. 26, 1978

[54] VANE TYPE METER

[75] Inventor: Walter Back, Mannheim, Fed. Rep. of Germany

[73] Assignee: Bopp & Reuther GmbH, Mannheim-Waldhof, Fed. Rep. of Germany

[21] Appl. No.: 842,923

[22] Filed: Oct. 17, 1977

[30] Foreign Application Priority Data

Oct. 20, 1976 [DE] Fed. Rep. of Germany ....... 2647297

[51] Int. Cl.$^2$ .............................................. G01F 1/06
[52] U.S. Cl. ...................................................... 73/229
[58] Field of Search ........................... 73/229, 253, 259

[56] References Cited

U.S. PATENT DOCUMENTS 3,572,118  3/1971  Hilzendegen ........................... 73/229

FOREIGN PATENT DOCUMENTS

| 510155 | 4/1952 | Belgium | 73/229 |
| 410451 | 10/1966 | Switzerland | 73/229 |
| 461826 | 10/1968 | Switzerland | 73/229 |
| 965629 | 8/1964 | United Kingdom | 73/229 |

Primary Examiner—Herbert Goldstein
Attorney, Agent, or Firm—Michael J. Striker

[57] ABSTRACT

A vane type meter includes an outer meter housing in which a cup-shaped impeller housing and cup-shaped counter housing superimposed on the impeller housing are mounted. The impeller housing is provided in the peripheral wall thereof with a plurality of rectangular, inwardly tapering inlet channels extending substantially tangential to the inner surface of the peripheral wall and with a plurality of upper outlet channels, of a number equal to that of the inlet channels and constructed substantially in the same manner as the latter. An impeller is arranged in the interior of the cup-shaped impeller housing for rotation about its axis and having a shaft extending into the counter housing. A plurality of radially extending ribs, equal in number to that of the inlet channels, project from the bottom wall of the impeller housing upwardly towards the impeller and a further plurality of radially extending ribs equal in number to that of the first mentioned plurality of ribs, project downwardly from the bottom of the counter housing toward the impeller.

13 Claims, 7 Drawing Figures

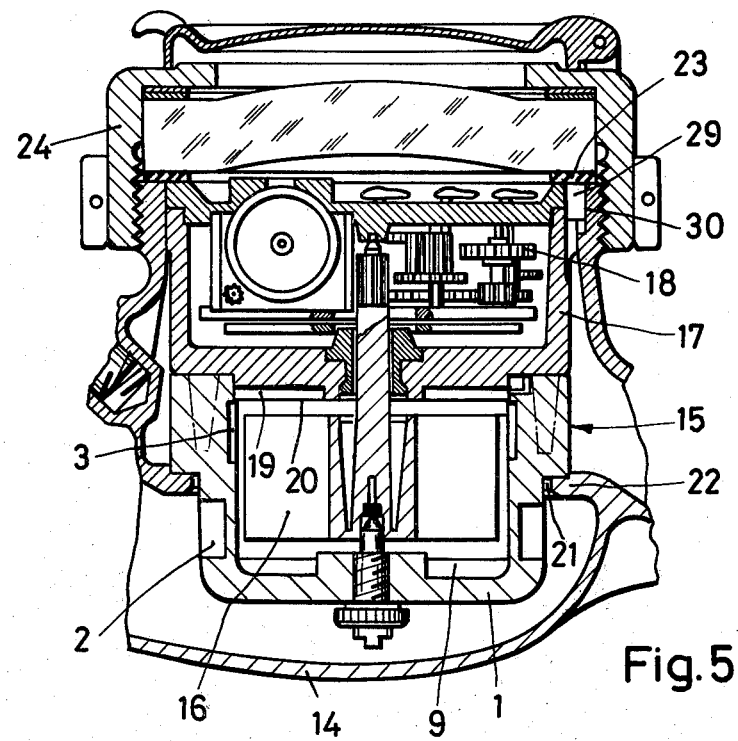
Fig. 5
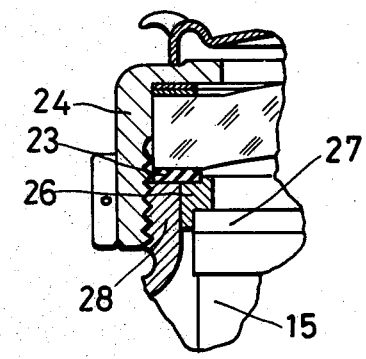
Fig. 6
Fig. 7

VANE TYPE METER

BACKGROUND OF THE INVENTION

The present invention relates to a vane type meter with a metering insert comprising a cup-shaped impeller housing and a cup-shaped counter housing mounted thereon, which can be inserted in an outer meter housing and secured therein against turning relative to the meter housing by an arresting projection engaging in an arresting groove. The cup-shaped impeller housing, preferably formed from plastic material, is provided at the bottom thereof with a plurality of radially extending upwardly projecting ribs and the peripheral wall of the cup-shaped impeller housing is formed with an even number of rectangular inwardly tapering inlet channels extending substantially tangential to the inner surface of the peripheral wall evenly distributed about the circumference of the latter, and with a plurality of upper outlet channels extending likewise in tangential direction. The counter housing, likewise preferably formed from plastic material, is provided at the bottom thereof with a plurality of radially extending ribs projecting downwardly into the interior of the impeller housing. An impeller, likewise preferably formed from plastic material is arranged in the interior of the impeller housing between the bottom faces of the ribs on the bottom of the counterhousing and the top faces of the ribs at the bottom of the impeller housing, for rotation about its axis and having a shaft extending through an appropriate opening in the bottom wall of the counter housing into the interior of the latter.

In such a vane type meter as disclosed in the DT-AS No. 1,623,929 it has already been possible by an all around considerable tapering and by a special arrangement of the inlet channels to obtain a large maximal throughflow at a permissible pressure loss of 10 m water column through the meter, while simultaneously improving the lower measuring range limit so that this meter could be used as a multiple range meter for a nominal load of 3–5 m$^3$/h or 7–20 m$^3$/h. A further increase of the throughput was however not possible and, in addition, the metering insert of this meter could not generally be mounted in meter housings of various types since, at an unfavorable position of the arresting groove in the meter housing provided for engagement with a corresponding arresting projection on the insert, the desired operating exactness could not be obtained.

SUMMARY OF THE INVENTION

It is an object of the present invention to provide a vane type meter of the aforementioned kind in which the throughput of the meter is increased, while the operating sensitivity within the permissible error limits is maintained.

It is a further object of the present invention to construct the measuring insert in such a manner that it may be installed with the same exactness also in meter housings produced by different manufacturers.

With these and other objects in view, which will become apparent as the description proceeds, the vane type meter according to the present invention mainly comprises a cup-shaped impeller housing having a bottom wall and a peripheral wall projecting upwardly from said bottom wall, a plurality of inlet channels extending uniformly spaced from each other through the peripheral wall substantially tangential to the inner surface of the latter, a plurality of outlet channels, equal in number to that of the inlet channels, extending uniformly spaced from each other through the peripheral wall above the inlet channels, also substantially tangential to the inner surface of the peripheral wall, in which the channels have rectangular cross sections defined laterally by a planar vertical faces inclined with respect to each other so that the open cross section of each channel tapers at the same angle toward the inner surface of the peripheral wall, a cup-shaped counter housing mounted on the cup-shaped impeller housing and having a bottom wall closing the upper open end of the cup-shaped impeller housing, and a plurality of radially extending ribs on each of said bottom walls, in which the number of ribs on each of the bottom walls is equal to the number of the inlet channels, with the ribs on the bottom wall of the impeller housing projecting upwardly therefrom and the ribs on the bottom wall of the counter housing projecting downwardly therefrom into the interior of the impeller housing.

The side walls of the inlet channel taper at the same angle towards the inner surface of the peripheral wall as the side walls of the outlet channel and this angle is preferably about 7°.

The relationship of the height to the width of the cross-sections of all channels is preferably about 3 : 1.

Due to the equal number of the inlet and the outlet channels and due to the equal rotation-symmetrical formation of the outlet channels in the upper region of the cup-shaped impeller housing relative to the lower inlet channels there will result, for the inlet acceleration of the partial streams flowing into the impeller housing through the inlet channels and for the outlet deceleration at the outflow over the outlet channels, uniform flow conditions in the cup-shaped impeller housing, so that the pressure loss may be lowered to a minimum value, whereby the throughput, at a 10 meter water column pressure loss, can be further increased.

Since some manufacturers of vane type meters provide the arresting groove in the meter housing at the inlet side of the meter, while other manufacturers provide the arresting grooves at the outlet side of the meter, the measuring insert with the arresting projection is mounted in the outer meter housing either in one or in a 180° turned position, whereby up to now for the same metering insert different throughflow conditions and therewith differences in the characteristics of the error curves resulted. Since the measuring insert according to the present invention is provided with an equal even number of inlet and outlet channels and since both rows of channels are equally constructed, these channels are arranged symmetrically with respect to each other in any turned position of the insert, so that the measuring insert with its arresting projecting can in any position mounted in the outer meter housing, without any change of the throughflow conditions through the measuring insert. A satisfactory operation of the meter at a practically equal error curve is thus obtained, independent from the position of the arresting groove for the metering insert on the outer meter housing, so that the metering insert can universally be used in any outer meter housing.

Since only the side walls of the inlet and outlet channels converge toward each other and since the relationship of the height to the width of each channel is about 3 : 1, there will result, at the inner surface of the peripheral wall of the cup-shaped impeller housing, inlet and outlet channel cross-sections of maximum height, to thus utilize fully the available height of the cup-shaped impeller housing, so that the open cross-section of each channel, also at the reduced inner end, is still so large that an essentially increased liquid throughput, at a permissible pressure loss of 10 meters water column, is possible. It has been shown that the smallest pressure loss occurs at a tapering of the channel side faces of about 7° and a straight construction of the channels and that thereby a sufficient kinetic flow energy is produced at the lower measuring range limit. Due to the relationship of the height to the width of about 3 : 1 of the open cross-section of each channel, the inlet and the outlet channels are, at the inner surface of the peripheral wall of the impeller housing, so small, so that the tangential inflowing partial liquid streams will, in the throughput region at the lower measuring range limit, still impinge with a sufficiently high energy on the impeller wings so that an indication of the amount of liquid flowing through the meter without any errors is assured.

The symmetrical construction of the ribs at the upper and lower end of the impeller housing assures equal damming conditions in the upper and lower flow region of the measuring insert, which prevent a one sided hydraulical loading of the impeller and which result in a flatter error curve for the forward and rearward movement of the meter also in higher throughflow regions.

Due to the high sensitivity of response on the one hand, and the high maximum throughput due to the low pressure loss and the pressure recoverable by the uniform flow, on the other hand, it is possible to obtain, instead of known vane type meters of a nominal size of 3, 5 and 7 $m^3/h$, by means of the universal measuring insert according to the present invention a new meter for a throughput for 3–7 $m^3/h$ with a lower measuring limit of 20 l/h or to increase known multiple range meters in the range of 3–5 $m^3/h$ to a meter with a throughput of 3–7 $m^3/h$. In addition, the meter according to the present invention, due to the symmetrical arrangement of the inlet and outlet channels, will operate equally well in either direction of turning of the impeller.

For known meter housings with a nominal load of five or more $m^3/h$, it is advantageously suggested to adapt the dimensions of the measuring insert to the norm dimensions for smaller meters of 3 $m^3/h$ and to provide for the mounting of such a universal measuring insert into larger meter housings in the separating wall of the meter housing an adapter ring of angular cross-section. By the angular seat adapter ring it is possible to compensate for the small difference in the meter housing seat diameter and also for the height of the seat in the meter housing so that the measuring insert according to the invention may be used in a 3 $m^3/h$ housing without seat adapter ring and in larger meter housings with an appropriate seat adapter ring.

Meter housings produced in various countries deviate in their dimensions from the German norms. Thus, the inner diameter at the upper end of the meter housing may be greater than the diameter at the upper end of the measuring insert according to the norm and in addition, the distance from the housing seat to the upper edge of the meter housing differs quite often. In order to compensate for these differences, it is possible to mount on the head of the universal metering insert also a correspondingly constructed adapter ring.

In addition, it is suggested according to the present invention to arrange the bottom faces of the inlet channels at substantially the same elevation as the upper edges of the ribs at the bottom of the cup-shaped impeller housing so that the inlet channels may be provided with the maximum possible height and so that in addition a better damming, especially in the upper throughflow region, is obtained.

Furthermore, it has been found advantageous to arrange the upper faces of the outlet channels substantially at the same elevation as the bottom edges of the ribs provided at the bottom of the cup-shaped counter housing, whereby the turbulence is improved also in the upper region and so that during return movement of the meter the same pressure conditions will prevail as in the forward movement thereof.

Since the outlet channels, which are located in the upper portion of the cup-shaped impeller housing in which the peripheral wall of the same is thicker than in the lower portion, are longer than the inlet channels, the upper faces of the outlet channels are preferably outwardly and upwardly inclined toward the outer surface of the peripheral wall of the impeller housing, so as to increase the open cross section of the outlet channels toward the outer surface of the peripheral wall. Thereby the small flow difference, resulting from the different length of the outlet channels with respect to the inlet channels, is compensated and during reverse movement of the meter the partial streams are provided with a downward deflection toward the wings of the impeller. If the upwardly inclined upper faces of the outlet channels are stepwise formed, the outlet channels can be easier injection molded by means of wedge shaped inserts.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 5 is a vertical cross-section through the whole meter with the metering insert mounted in the meter housing;

FIG. 6 is a partial cross-section through the separating wall of the meter housing and a seat adapter ring for the measuring insert; and FIG. 7 is a partial cross-section through the top of the meter housing with an angular adapter ring mounted at the upper end of the metering insert.

DESCRIPTION OF THE PREFERRED EMBODIMENTS

Figure 1:
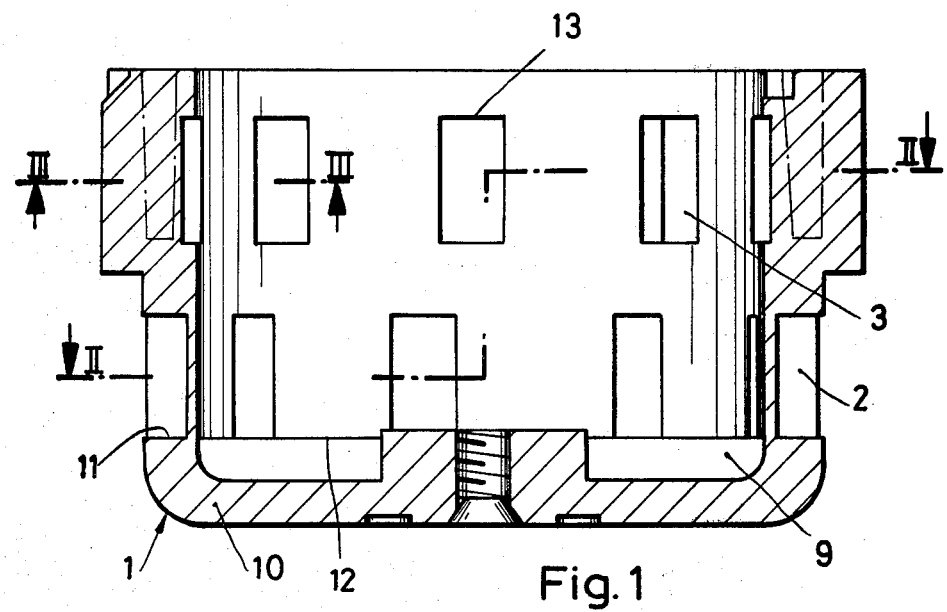
FIG. 1 is a cross-section according to the line I—I of FIG. 2 through the cup-shaped impeller housing according to the invention.
Figure 2:
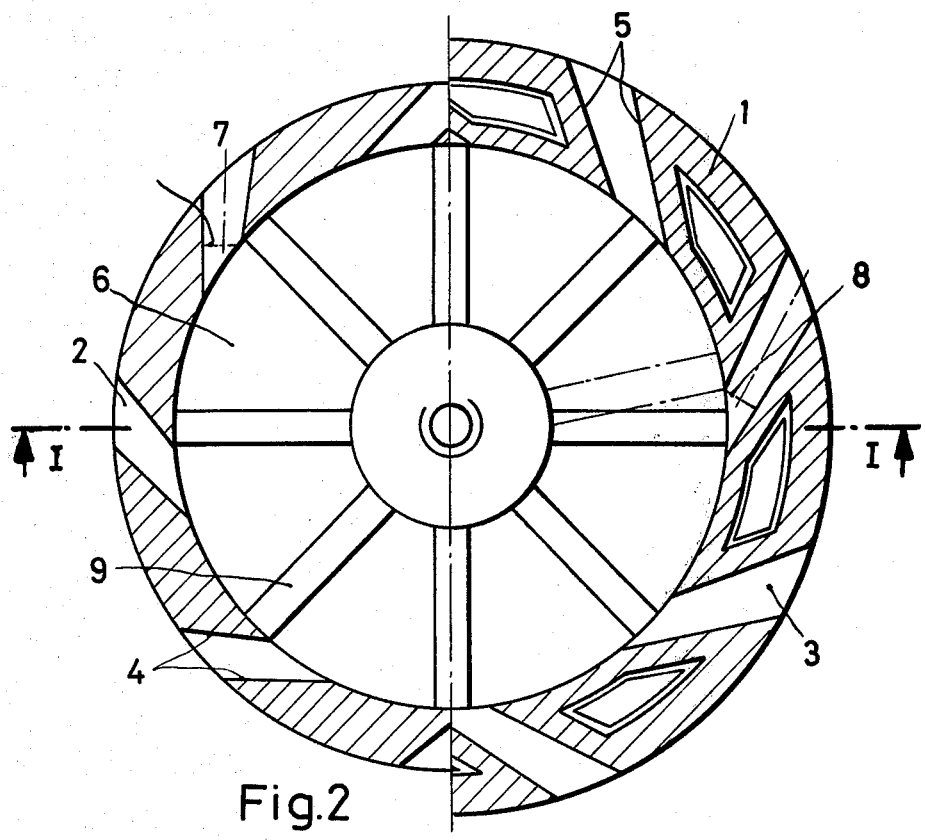
FIG. 2 is a cross-section of the impeller housing along the line II—II of FIG. 1 and showing at the left side of FIG. 2 the cross-section through the inlet channels and at the right side the cross-section through the upper outlet channels.

The cup-shaped impeller housing 1, preferably formed of plastic material, illustrated in FIGS. 1 and 2 is provided in the lower region of its peripheral wall with an even number, for instance eight, of inlet channels 2 and in an upper region thereof with outlet channels 3. The inlet and outlet channels 2 and 3 are uniformly distributed about the circumference of the peripheral wall and the number of outlet channels 3 is equal to the even number of the inlet channels 2. The eight lower inlet channels 2 have a rectangular cross-section and end substantially tangential to the inner surface of the peripheral wall, whereas the two side faces 4 of the inlet channels are planar faces inclined with respect to each other in such a manner that the cross-sections of the inlet channels 2 taper toward the inner surface of the peripheral wall. The taper of the inlet channels 2 is preferably about 7°. The outlet channels 3 are similarly constructed, that is, they are substantially tangential to the inner surface of the peripheral wall and they have likewise a rectangular cross-section with the side walls 5 thereof inclined with respect to each other so that the open cross-section of the outlet channels tapers in radially inward direction at an angle of substantially 7°. The open cross section 7 of the inlet channels 2, normal to the longitudinal axis thereof, at the inner end at which these channels communicate with the interior 6 of the impeller housing, is equal to the corresponding rectangular cross-section 8 of the outlet channels 3 at the inner peripheral surface of the cup-shaped impeller housing and the relationship of height to the width at the cross-sections 7 and 8 for the inlet channels 2 as well as for the outlet channels 3 is substantially 3:1. A number of the radially extending ribs 9 project upwardly from the bottom wall 10 of the cup-shaped impeller housing 1, and a corresponding number of ribs 19 (FIG. 5) project downwardly from the bottom wall of the cup-shaped counterhousing 17 into the interior of the impeller housing 1. The number of ribs respectively provided on the bottom walls of the impeller housing and the counter housing is equal to the number of the inlet channels 2 and that of the outlet channels 3. The bottom faces 11 of the inlet channels 2 are substantially at the same elevation as the upper edges 12 of the ribs 9 on the bottom wall 10 of the cup-shaped impeller housing 1.

Figure 3:
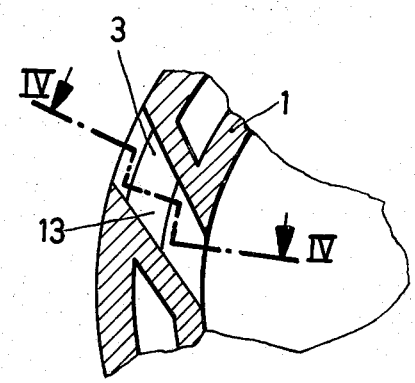
FIG. 3 is a partial cross-section according to the line III—III of FIG. 1 through the impeller housing.
Figure 4:
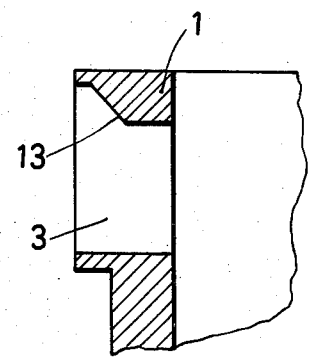
FIG. 4 is a cross-section according to the line IV—IV of FIG. 3.

As shown in FIGS. 3 and 4, the upper face 13 of each outlet channel 3 is stepwise upwardly inclined toward the outer surface of the cup-shaped impeller housing 1.

The vane-type meter illustrated in FIG. 5 has a meter housing 14 in which a metering insert 15 is mounted. The metering insert 15 is suitable as universal metering insert for meter housings of different manufacturers and consists of the above-described cup-shaped impeller housing 1 with the impeller wheel 16 rotatably mounted therein and the cup-shaped counterhousing 17 mounted in a fixed angular position thereon, in which a counter 18 is arranged driven by the shaft of the impeller wheel 16, which extends through an appropriate bearing in the bottom wall of the counter housing into the interior of the latter. The impeller housing 1, the counter housing 17 and the impeller 16 with its shaft are preferably injection molded from plastic material. The cup-shaped counter housing 17 is provided at the bottom wall thereof with integrally molded radially extending ribs 19 which project dowwardly from the bottom wall into the interior 6 of the cup-shaped impeller housing 1. The number of the upper ribs 19 corresponds to the number of the ribs 9 at the bottom wall of the cup-shaped impeller housing 1. The upper faces 13 of the outlet channels, at the inner ends of the latter, are substantially at the same elevation as the bottom edges 20 of the upper ribs 19. The metering insert 15 is mounted in the seat 21 of the separating wall 22 of the meter housing 14 and it is held at the upper end over an annular sealing ring 23 by a head 24 screwed onto the upper end of the meter housing 14.

The measuring insert 15 is constructed as a universal measuring insert for mounting into different meter housings produced by different manufacturers. The dimensions of the measuring insert 15 correspond advantageously, for its use as multiple range meter of the size 3–7 m$^3$/h, to the norm for inner dimensions of a meter of the nominal size 3 m$^3$/h and for its use in a larger meter, for instance to the norm for inner dimensions of a meter of the nominal size 7 m$^3$/h. For the mounting of this universal melting insert into larger meter housings a seat adapter ring 25 of angular cross-section, as shown in FIG. 6, is provided in the separating wall 22 of the meter housing 14. If the dimensions at the inner diameter and at the height of the head of the meter housing deviate essentially from the corresponding dimensions of the universal metering insert 15, then a corresponding head adapter ring 26, likewise of angular cross-section, can be placed onto the head 27 of the metering insert 15, in addition to seat adapter ring 25, so that the upper adapter ring 26 will abut against a corresponding portion 28 of the outer meter housing and against the sealing ring 23.

The metering insert 15 is provided with an arresting projection 29 which engages in an arresting groove 30 provided in the meter housing 14 to prevent rotation of the measuring insert 15 relative to the meter housing 14. Due to the rotation symmetrical arrangement of the inlet channels 2 and the outlet channels 3 it is immaterial for the operating exactness of the meter whether the arresting groove 30 is provided at the inlet or at the outlet side of the meter housing.

It will be understood that each of the elements described above, or two or more together, may also find a useful application in other types of vane type meters, differing from the types described above.

While the invention has been illustrated and described as embodied in a vane type meter in which the peripheral wall of the impeller housing thereof is provided with an equal even number of inlet and outlet channels, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a vane type meter, a combination comprising a cup-shaped impeller housing having a bottom wall and a peripheral wall projecting upwardly from said bottom wall; an even number of inlet channels extending uniformly spaced from each other through said peripheral wall substantial tangential to the inner surface of the latter; a plurality of outlet channels equal in number to that of the inlet channels and extending uniformly spaced from each other through said peripheral wall above said inlet channels also substantially tangential to the inner surface of said peripheral wall, said channels having rectangular cross-section defined laterally by planar faces inclined with respect to each other so that the open cross-section of each channel tapers towards the inner surface of said peripheral wall; a cup-shaped counter housing mounted on said cup-shaped impeller housing and having a bottom wall closing the upper open end of said cup-shaped impeller housing; and a pluraliy of radially extending ribs on each of said bottom walls, the number of ribs on each of said bottom walls being equal to the number of said inlet channels, the ribs on said bottom wall of said impeller housing projecting upwardly therefrom and the ribs on said bottom wall of said counter housing projecting downwardly therefrom into the interior of the impeller housing.

2. A combination as defined in claim 1, wherein the side walls of said inlet channels are inclined at the same angle with respect to each other as the side walls of said outlet channels.

3. A combination as defined in claim 2, wherein said angle is about 7°.

4. A combination as defined in claim 2, wherein the cross section of each inlet channel normal to the longitudinal axis thereof at the inner end of said inlet channel is equal to the cross-section of each outlet channel normal to the axis of the latter and at the inner end thereof.

5. A combination as defined in claim 4, wherein the relationship of the height to the width of each of said cross sections of said channels is about 3:1.

6. A combination as defined in claim 1, and including an outer meter housing in which said impeller housing and said counter housing are mounted, and means for preventing said counter housing to turn relative to said meter housing.

7. A combination as defined in claim 1, wherein said ribs on said bottom wall of the impeller housing have upper edges located substantially in one plane with the bottom faces of said inlet channels.

8. A combination as defined in claim 1, wherein said ribs on said bottom wall of said counter housing have bottom edges located substantially in one plane with the upper faces of said outlet channels.

9. A combination as defined in claim 1, wherein the upper face of each outlet channel is at least in part inclined to the bottom face thereof such that the upper face is spaced further from said bottom wall at the outer surface of the peripheral wall than at the inner surface of the latter.

10. A combination as defined in claim 9, wherein said upper face is stepped face.

11. A combination as defined in claim 6, wherein said outer meter housing has a transverse wall arranged for separating said inlet channels of said impeller housing from said outlet channels thereof, said transverse wall being provided with a seat for mounting a corresponding seat portion of said impeller housing, and including an adapter ring on said seat when said seat portion of the impeller housing has a smaller diameter than said seat so that an impeller housing of predetermined dimensions may be universally used in outer meter housings of different manufacturers and having seats of different diameters.

12. A combination as defined in claim 11, and including a further adapter ring between the upper end of said outer meter housing and the adjacent portion of said counterhousing.

13. A combination as defined in claim 12, wherein said adapter rings have angular cross-sections.

* * * * *